Patented Aug. 31, 1926.

1,598,259

UNITED STATES PATENT OFFICE.

WILLIAM H. ROSS, RUSSELL M. JONES, AND ARNON L. MEHRING, OF WASHINGTON, DISTRICT OF COLUMBIA; DEDICATED, BY MESNE ASSIGNMENTS, TO THE CITIZENS OF THE UNITED STATES OF AMERICA.

PROCESS FOR THE SIMULTANEOUS PRODUCTION OF POTASSIUM PHOSPHATE AND PHOSPHORIC ACID.

No Drawing. Application filed March 4, 1924. Serial No. 696,885.

(GRANTED UNDER THE ACT OF MARCH 3, 1883; 22 STAT. L. 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to us of any royalty thereon.

This invention relates to a process for the production of a material containing both potash and phosphoric acid in a form suitable for use directly in the manufacture of concentrated fertilizers.

The main object of this invention is to bring about by volatilization the simultaneous production of phosphoric acid and potash from a mixture containing phosphate rock and a potash silicate and under such conditions that the silica of the potash silicate will facilitate the volatilization of the phosphorus in the rock, and the residual lime of the rock will bring about the liberation of the potash in the potash silicate.

A further object of this invention is to provide a process which will bring about the simultaneous volatilization of phosphorus and potash from a charge containing phosphate rock and a potash silicate at a lower temperature than has heretofore been proposed and below the fusion point of the charge.

We are aware that it has been proposed to simultaneously volatilize phosphorus and potash from a charge containing phosphate rock and a potash silicate as disclosed, for example, in U. S. Patent 1,299,337. The process therein described provides for the smelting of the rock and silicate in an electric furnace at such a temperature that the residual material is reduced to a molten slag and as such is intermittently tapped from the furnace.

We have discovered, however, that when phosphate rock, a potash silicate and a carbonaceous material are mixed in the preferred proportions hereinafter described, and heated in an atmosphere of a non-oxidizing gas, complete evolution of both the phosphorus and potash takes place below the temperature necessary to bring about fusion of the residual material. Our invention thus furnishes a process which is adapted to continuous operation not only in an electrically heated furnace but also in fuel-fed furnaces as of the rotary kiln type. The relatively low temperature at which the process may be operated not only increases the life of the refractory lining of the furnace but also affords an economy in the cost of the power as compared with those processes which require the charge to be reduced to a molten slag in an electric furnace.

The raw materials now commercially used in the volatilization process of preparing phosphoric acid are phosphate rock, sand and coke. When these are ignited at the proper temperature under reducing conditions phosphorus is evolved in the elementary state. If the ignition, however, is made in a type of furnace from which the air is not excluded the evolved phosphorus is at once oxidized to phosphorus pentoxide and escapes from the furnace as dense white fumes. Owing to the hygroscopic nature of this fume it readily reacts with the moisture of the air with which it comes in contact, or with the moisture driven off from the charge and may be recovered as a solution of ortho-phosphoric acid by passing through a Cottrell precipitator.

It is known that when a potash silicate such as feldspar is ignited with lime at a temperature of 1300–1400° C. a greater or less proportion of the potash is volatilized depending on the basicity of the charge.

If the volatilization of phosphoric acid from phosphate rock is due in a corresponding way to a replacement of phosphoric acid by silicic acid, then an increase in the basicity of the charge such as that brought about by the substitution of a potash silicate for sand should have the effect of increasing the difficulty of volatilizing the phosphoric acid.

We have found, however, that when chemically pure tricalcium phosphate was ignited for one hour at 1300° C. with or without silica added very little if any loss of phosphorus occurred either in an oxidizing or oxygen-free atmosphere. When the phosphate was mixed with one-fifth of its weight of carbon, however, and the mixture heated as before under reducing conditions about 45 per cent of the phosphorus escaped from the charge. At a temperature of 1400° C. the phosphorus volatilized was increased to 96 per cent of the total present and was complete at 1550° C. leaving an unfused residue consisting of lime and free carbon. The addition of both sand and carbon to the phosphate had a still more marked effect on the volatilization of the phosphorus. Thus in a mixture of phosphate rock, silica and carbon containing three molecular equivalents of lime to one of silica the loss of phosphorus in a reducing atmosphere amounted to 97 per cent at 1300° C. As the proportion of silica in the charge was increased until it contained only one equivalent of lime to one of silica, the loss of phosphorus decreased instead of increased as would be expected if the reaction simply involved the replacement of one acid radical by a less volatile one.

Possible reactions which may occur when calcium phosphate is ignited with silica and carbon either singly or in combination may be represented as follows:

(1) $Ca_3(PO_4)_2 + 5C = 3CaO + P_2 + 5CO$.
(2) $Ca_3(PO_4)_2 + 8C = Ca_3P_2 + 8CO$.
(3) $Ca_3(PO_4)_2 + 8C = 3Ca + P_2 + 8CO$.
(4) $Ca_3(PO_4)_2 + 3SiO_2 = 3CaO.SiO_2 + P_2O_5$.
(5) $Ca_3(PO_4)_2 + 2SiO_2 = (CaO)_3(SiO_2)_2 + P_2O_5$.
(6) $2Ca_3(PO_4)_2 + 3SiO_2 = 3(CaO)_2.SiO_2 + 2P_2O_5$.
(7) $Ca_3(PO_4)_2 + SiO_2 = (CaO)_3.SiO_2 + P_2O_5$.
(8) $Ca_3(PO_4)_2 + 3SiO_2 + 5C = 3CaO.SiO_2 + P_2 + 5CO$.
(9) $Ca_3(PO_4)_2 + 2SiO_2 + 5C = (CaO)_3.(SiO_2)_2 + P_2 + 5CO$.
(10) $2Ca_3(PO_4)_2 + 3SiO_2 + 10C = 3(CaO)_2.SiO_2 + 2P_2 + 10CO$.
(11) $Ca_3(PO_4)_2 + SiO_2 + 5C = (CaO)_3.SiO_2 + P_2 + 5CO$.

The temperatures at which each of these reactions is in equilibrium under a pressure of one atmosphere of the reacting gases can be calculated on theoretical grounds by means of Nernst's theorem, (Theoretical Chemistry. Walter Nernst, 7th Ed. p. 758) when the heat of the reaction Q is known. Thus calculation when made for each of the above equations gives results as follows:

| Equation No. | Q. | Temperature |
|---|---|---|
| | Calories. | ° C. |
| 1 | 418,900 | 1385 |
| 2 | 664,920 | 1690 |
| 3 | 749,920 | 1680 |
| 4 | 105,850 | 2310 |
| 5 | 109,400 | 2390 |
| 6 | 223,900 | 2550 |
| 7 | 130,850 | 2860 |
| 8 | 365,350 | 1190 |
| 9 | 368,900 | 1200 |
| 10 | 752,900 | 1260 |
| 11 | 390,350 | 1280 |

The results which are thus deduced theoretically are in agreement with those which we have found experimentally and show that at a sufficiently high temperature silica will replace phosphoric acid in a phosphate but that the reaction which takes place below 1300° will only occur when sufficient carbon is present. The former reaction will take place in an oxidizing atmosphere and is dependent on the acidity of the charge while the latter requires a reducing atmosphere and is independent of the acidity. Equally good results in the volatilization of phosphorus were accordingly obtained with a potash shale as with silica when smelted with phosphate rock and carbon in a reducing atmosphere at 1300° C. As the phosphorus is driven off the calcium of the rock remains behind as the oxide which at once reacts to replace any potassium contained in the silicates of the mixture. Under these conditions the phosphorus is evolved in the elementary state while the potassium escapes from the charge as the oxide. By igniting the fume as it escapes from the furnace the phosphorus is oxidized to phosphorus pentoxide and may be recovered together with the potash by the Cottrell process or by any other means applicable to the collection of suspended particles in a gas.

As an example of our invention we first grind the phosphate rock, potash silicate and carbon to a fineness of at least 10 mesh. These materials are mixed in the approximate proportion of 30 parts of phosphate rock, 5 of potash silicate and 7.5 of carbon, or in such proportion that the mixture contains one to three times the molecular equivalent of lime to one of silica with a carbon content of 20 to 25 per cent. The materials may be mixed before grinding or ground separately as desired. The mixture in a loose state, or compressed into briquettes is then fed into an electric or fuel-fed furnace and heated at about 1300° C. in a non-oxidizing atmosphere. The evolved fumes of phosphorus and potash are burned as they escape from the furnace and the resulting oxides then led into a Cottrell treater where they are precipitated with the addition of water if necessary to form a solution of potassium phosphate in phosphoric acid.

Increasing the potash silicate in the charge beyond the amount specified for best results reduces the percentage of potash volatilized, although the total amount volatilized may be greater. The carbon in the charge on the other hand may be increased between rather wide limits without materially affecting the reaction and when the amount present exceeds 25 per cent of the charge the phosphorus and potash may be completely volatilized without producing any noticeable sintering or fusion of the recoverd slag.

What we claim is:—

1. A process for the production of a fertilizer material containing potassium phosphate and phosphoric acid which consists in igniting a mixture of phosphate rock, a potash silicate and a carbonaceous material in a reducing atmosphere at 1300° C., burning the evolved fume as it escapes from the furnace, and recovering the resulting product in a Cottrell precipitator.

2. A process for the simultaneous production of potassium phosphate and phosphoric acid which consists in igniting a mixture of phosphate rock, Georgia shale and coal in a reducing atmosphere at a temperature below that required to reduce the change to a molten slag, burning the evolved fume as it escapes from the furnace, and recovering the resulting product in a Cottrell precipitator.

3. A process for the production of a fertilizer material containing potassium phosphate and phosphoric acid which consists in igniting a mixture of 30 parts of phosphate rock, 5 of a potash silicate and 7.5 of coal in a reducing atmosphere at a temperature below that required to reduce the change to a molten slag, burning the evolved fume as it escapes from the furnace, and recovering the resulting product in a Cottrell precipitator.

4. A process for the production of a fertilizer material containing potassium phosphate and phosphoric acid which consists in igniting a mixture of phosphate rock, a potash silicate, and a carbonaceous material at a temperature below that required to reduce the charge to a molten slag, burning the evolved fume as it escapes from the furnace and recovering the resulting product.

5. A process for the simultaneous production of potassium phosphate and phosphoric acid which consists in making an intimate mixture of phosphate rock, a potash silicate and a carbonaceous material in such proportions that the carbon present constitutes at least 20 per cent of the mixture and the lime content is one to three times the equivalent of the silica present, forming the materials so mixed into briquettes, igniting the briquettes at a temperature below that required to reduce the charge to a molten slag, burning the evolved fume as it escapes from the furnace, and recovering the resulting product in a Cottrell precipitator.

6. A process for the production of a fertilizer material containing potassium phosphate and phosphoric acid which consists in igniting a mixture of phosphate rock, a potash silicate and a carbonaceous material in a reducing atmosphere at a temperature below that required to reduce the charge to a molten slag, burning the evolved fume as it escapes from the furnace, and recovering the resulting product in a Cottrell precipitator.

7. A process for the production of a fertilizer material containing potassium phosphate and phosphoric acid which comprises igniting a mixture of phosphate rock, a potassium silicate and a carbonaceous material in a reducing atmosphere at a temperature below that required to reduce the charge to a molten slag.

8. A process for the simultaneous production of potassium phosphate and phosphoric acid which consists in making an intimate mixture of phosphate rock, a potash silicate and a carbonaceous material, forming the mixture into briquettes, igniting the briquettes at a temperature below that required to reduce the charge to a molten slag, and recovering the volatilized products.

9. A process for the simultaneous production of potassium phosphate and phosphoric acid which consists in making an intimate mixture of phosphate rock, a potash silicate and a carbonaceoous material, forming the mixture into briquettes, igniting the briquettes in a reducing atmosphere at a temperature below that required to reduce the charge to a molten slag, and recovering the volatilized products.

10. A process for the simultaneous production of potassium phosphate and phosphoric acid which consists in making an intimate mixture of phosphate rock, a potash silicate and a carbonaceous material, forming the mixture into briquettes, igniting the briquettes at a temperature below that required to reduce the charge to a molten slag, burning the evolved fume as it escapes from the furnnace and recovering the resulting products.

11. A process for the simultaneous production of potassium phosphate and phosphoric acid which consists in making an intimate mixture of phosphate rock, a potash silicate and a carbonaceous material, forming the mixture into briquettes, igniting the briquettes in a reducing atmosphere at a temperature below that required to reduce the charge to a molten slag, burning the evolved fume as it escapes from the furnace and recovering the resulting products.

WILLIAM H. ROSS.
RUSSELL M. JONES.
ARNON L. MEHRING.